Another object of the invention is to provide a paper receiving apron which may be hinged from a horizontal position to a downwardly angulated position to direct a length of paper, with sausages thereon, into a carton or onto a conveyor.

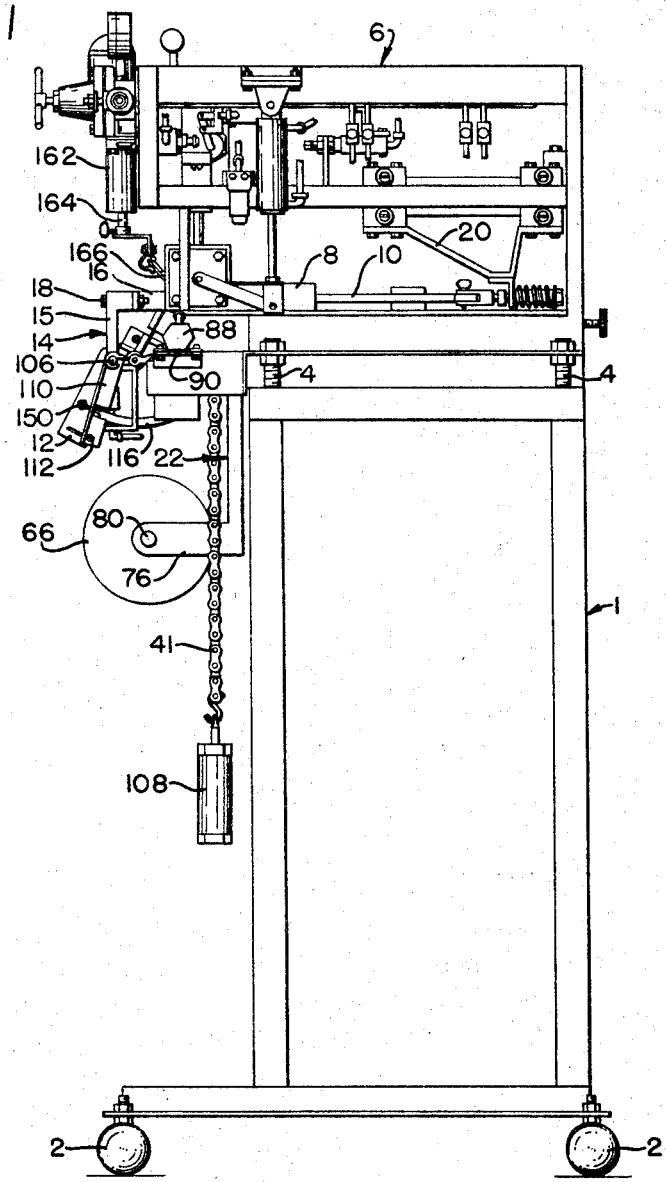

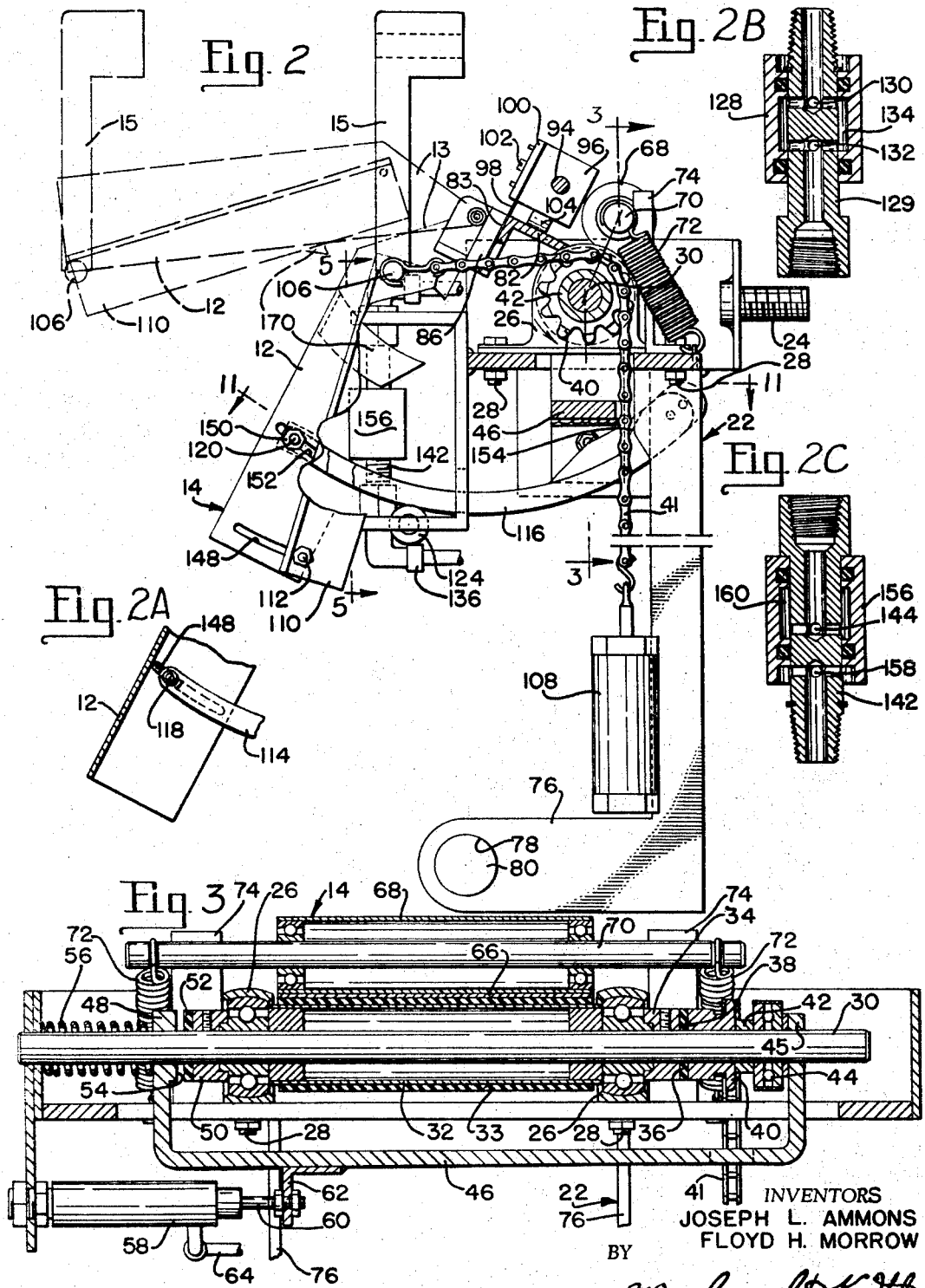

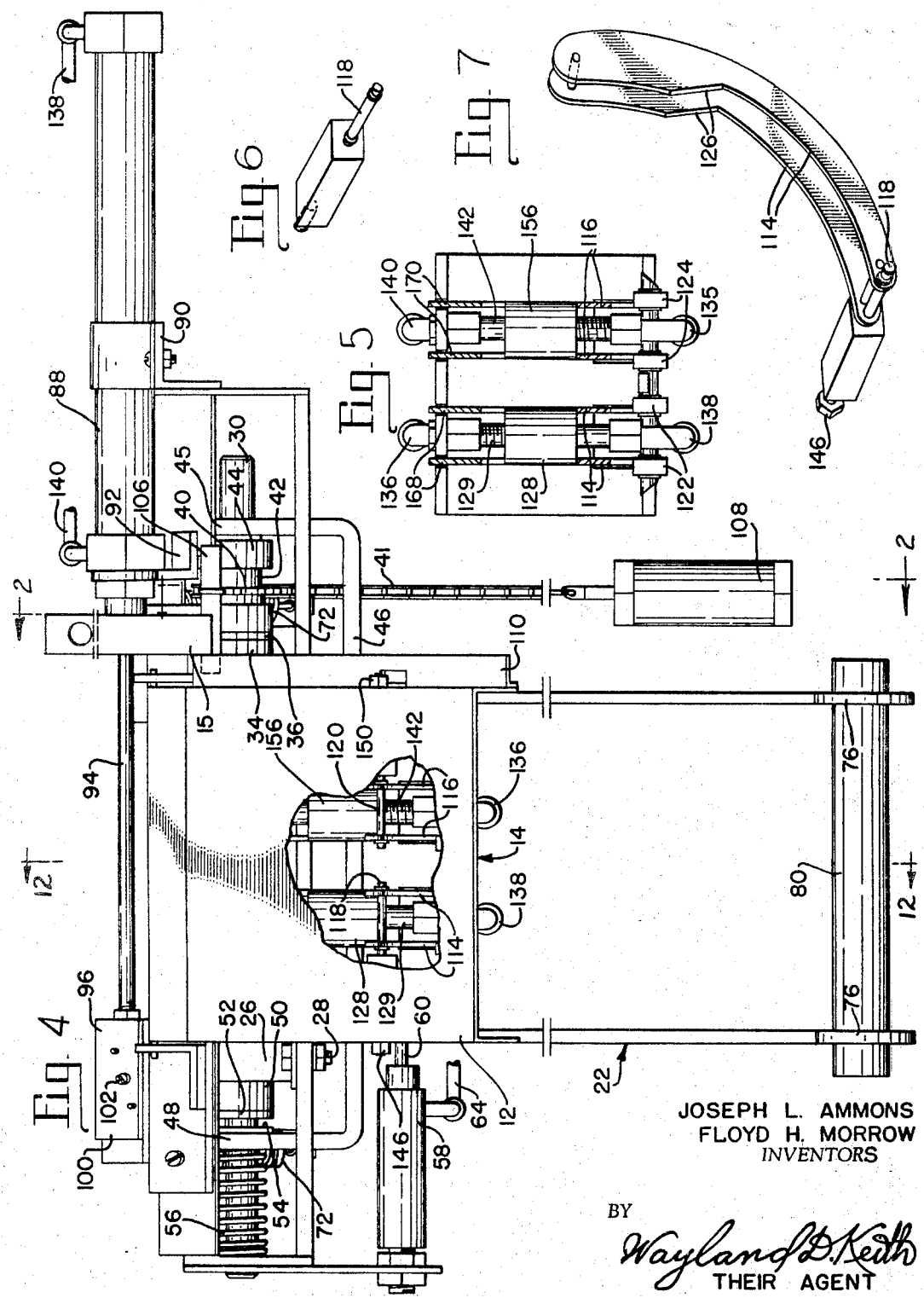

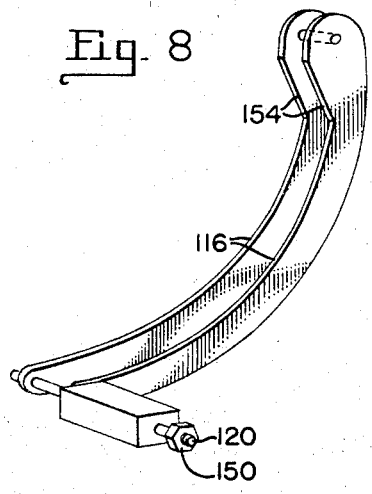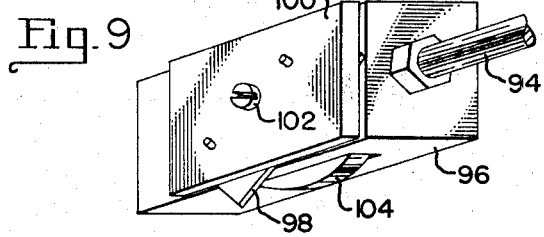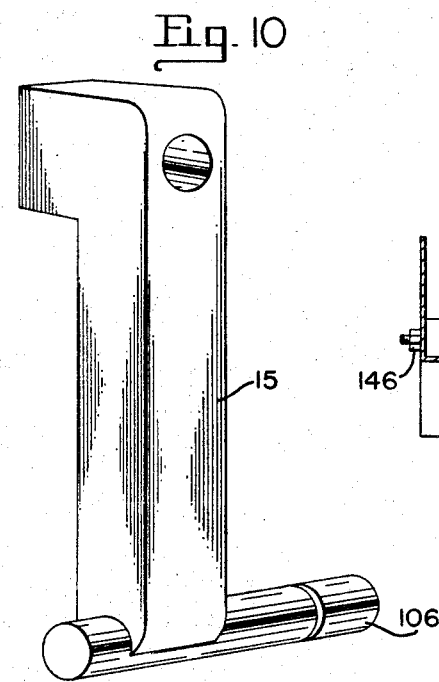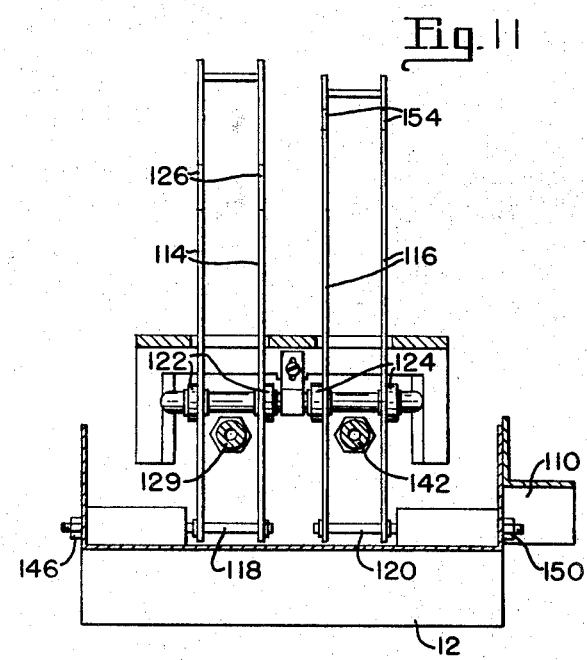

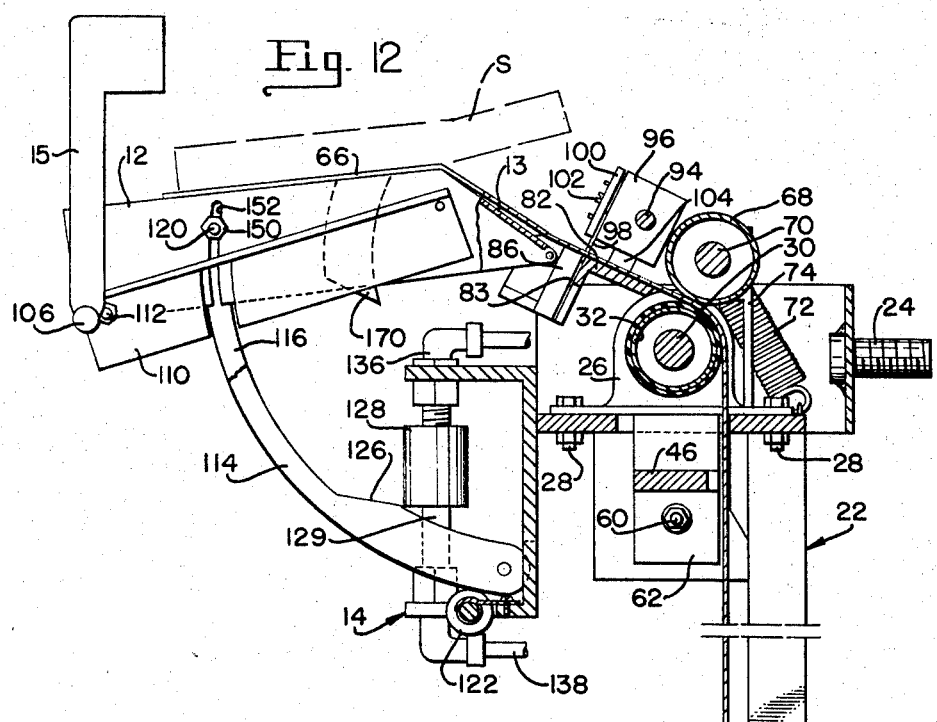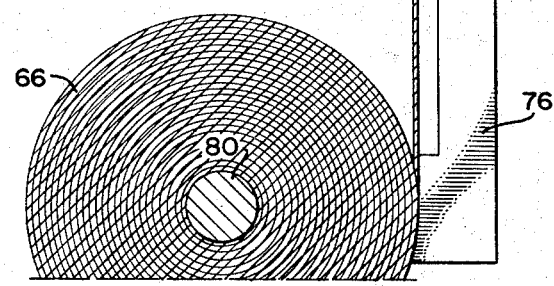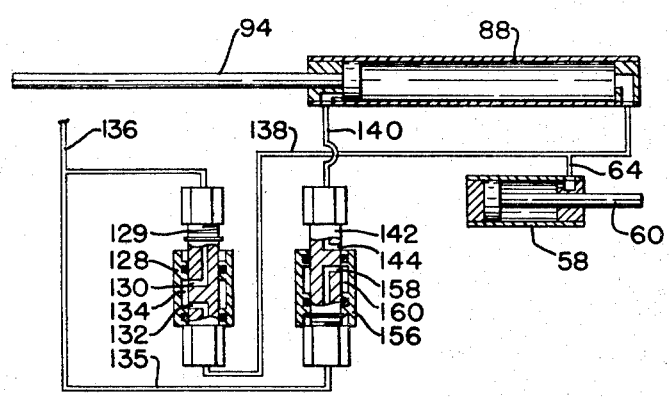
JOSEPH L. AMMONS
FLOYD H. MORROW
INVENTORS
THEIR AGENT ticularly sausage material, and which can be washed with water and/or high pressure steam, without damage to the mechanism.

Yet another object of the invention is to provide a self-contained machine which will operate on any suitable reciprocating dispensing machine.

A still further object of the invention is to provide mechanism to adjustably regulate the action of a cutting blade so that the cutting of the paper coincides exactly with the termination of the ejection cycle of the dispensing machine to which the present machine is attached.

With these objects in mind and others which will become manifest as the description proceeds, reference is to be had to the accompanying drawings in which like reference characters designate like parts in the several views thereof, in which:

FIG. 1 is a side elevational view of a skinless sausage molding machine, showing a sheet placing machine attached thereto, for use in conjunction therewith;

FIG. 2 is an enlarged sectional view taken on line 2—2 of FIG. 4, looking in the direction indicated by the arrows, with parts broken away and with parts shortened, with certain parts being shown in dashed outline, to show alternate positions;

FIG. 2A is a fragmentary, sectional view showing an adjustment member on an enlarged scale;

FIG. 2B is an enlarged lonigtudinal, sectional view of an air valve showing the interior construction thereof;

FIG. 2C is a view similar to 2B except with the friction slide sleeve thereof moved to the opposite position;

FIG. 3 is a longitudinal, sectional view taken through the paper feed roller, on the line 3—3 of FIG. 2 and showing the clutch and brake shifting mechanism;

FIG. 4 is a front elevational view of the papering machine removed from the sausage molding machine and showing parts thereof broken away and shortened, to show details of construction;

FIG. 5 is a longitudinal, sectional view through the valve mechanism, which valve mechanism is cam actuated;

FIG. 6 is a view of the pivot block on the papering machine;

FIG. 7 is a perspective view of one of the cam elements of the machine, which actuate the valves of the sheet placing machine;

FIG. 8 is a view similar to FIG. 7, but of a companion cam member, showing an associated block and pin attached thereto;

FIG. 9 is a fragmentary, perspective view of the cutter blade holder and showing a cutter blade therein and a roller journaled thereon;

FIG. 10 is a perspective view of an arm shown apart from the papering machine, showing a bar extending laterally outward therefrom for attachment of a chain at one end for operating certain portions of the papering machine in timed relation with the dispensing machine, such as a sausage molding machine, and showing an end of the bar extending in the opposite direction to act as a cam to move paper onto the paper receiving apron of the machine in a timed sequence with respect to the dispensing machine;

FIG. 11 is a sectional view taken on the line 11—11 of FIG. 2, looking in the direction indicated by the arrows, with parts being broken away and with certain parts being shown in dashed outline;

FIG. 12 is a fragmentary, sectional view taken on the

United States Patent Office 3,421,394
Patented Jan. 14, 1969

3,421,394
APPARATUS FOR PLACING SHEET MATERIAL ON A SURFACE AND CUTTING TO A PREDETERMINED LENGTH
Joseph L. Ammons, 1617 Lawson Lane 79106, and Floyd H. Morrow, P.O. Box 5884 79107, both of Amarillo, Tex.
Filed Mar. 17, 1965, Ser. No. 440,438
U.S. Cl. 83—157  13 Claims
Int. Cl. B26d 5/20; B26d 7/06

ABSTRACT OF THE DISCLOSURE

A machine for placing a sheet of film or paper onto a surface in timed sequence to a dispensing machine and cut the film or paper to a predetermined length from a roll of film. The machine is fluid operated and is so constructed to operate under damp, cold conditions and even when subjected to animal matter without damaging the machine. The machine provides for severing of the film upon the termination of the dispensing or ejection cycle and is adaptable to be used in refrigeration vaults, on sausage molding machines and the like in conjunction with conveyors.

This invention relates to paper placing machines and more particularly to paper placing machines for placing a sheet of paper or film onto which food products or the like are ejected. In the present instance the paper placing device is used in conjunction with sausage molding machines to place a sheet of film or treated paper upon a surface so the sausage will be ejected from the mold so that the freshly molded sausage can be readily handled and boxed without manual handling of the sausage or other food product.

Various paper or sheet placing machines have been proposed heretofore, but these, for the most part, were complex and often required electric motors or the like to operate the machine. The present machine is operated in timed relation to another machine, such as a sausage molding machine, which paper placing machine, when once regulated and started, is entirely automatic in operation.

An object of this invention is to provide a machine which will direct a sheet of film or paper onto a surface in timed relation with the machine or which it is to be used, to receive material thereupon.

Another object of the invention is to provide a sheet placing machine that is pneumatically actuated in timed relation to a sausage molding machine.

Still another object of the invention is to provide an air actuated sheet placing machine which will dispense a predetermined length of paper in timed relation to a sausage molding operation.

Still another object of the invention is to provide a machine which will dispense paper from a roll in timed sequence upon an article receiving surface and which will cut the paper to a required length.

Still another object of the invention is to provide a machine for placing a sheet of material, which machine is simple in construction, easy to operate, and easy to assemble and to disassemble.

A further object of the invention is to provide a machine which will dispense paper from a roll, in timed sequence, onto an article receiving surface and which can be adjusted to cut paper in selected lengths.

Still another object of the invention is to provide a machine which can be operated under damp, cold conditions, when subject to contact with animal matter, parline 12—12 of FIG. 4, looking in the direction indicated by the arrows, with parts being broken away and other parts being shown in dashed outline; and FIG. 13 is a diagrammatic view of the fluid system to actuate the mechanism of the sheet placing machine, with parts shown in section.

The present sheet placing or "papering" machine 14 has an arm 15 associated therewith, which arm 15 is secured to an outstanding, reciprocating extension member 16 on the molding machine 6, as by bolt 18. The sausage molding machine 6 has a carriage 20 which moves outwardly to eject molded sausage from the sausage mold cylinder block 8.

The papering machine 14 has a frame 22 which is secured to the molding machine as by bolts 24, in such a manner that the papering machine is positioned forwardly of and below the cylinders (not shown) of the mold cylinder block 8. The frame 22 has an upper surface portion thereof in position to mount bearings 26, which bearings 26 are secured in place, as by bolts 28. The bearings 26 have a shaft 30 journaled therein, transversely of the molding machine 6, which shaft 30 has a roller 32 mounted thereon and secured thereto, so that the roller will rotate in unison therewith. A set collar 34 is secured to shaft 30 adjacent the outer end of one of the bearings 26 and is fixed against rotation relative to the shaft 30. A friction member 36 surrounds shaft 30 and is in abutting relation with the face of set collar 34 and is disposed intermediate set collar 34 and the flat face 38 of mounting sprocket 40. The sprocket 40 is rotatably mounted on shaft 30. A spacer element 42 surrounds shaft 30 and is disposed intermediate the outer end of sprocket 40 and a thrust bearing 44, which thrust bearing 44 is disposed inwardly from an apertured, up-turned end 45 of a U-shaped yoke 46. The yoke 46 extends in longitudinally aligned relation with shaft 30 and abridges thrust bearing 44, spacer element 42, sprocket 40, friction member 36, set collar 34, bearings 26, roller 32 and has an up-turned end 48 which extends outwardly from a second bearing 26.

A set collar 50 surrounds shaft 30 adjacent the second bearing 26, which set collar 50 has a plane face on the outer end thereof adjacent which a friction member 52 is positioned. The up-turned end 48 of U-shaped yoke 46 has an inner plane face 54 to complementally engage the friction member 52 under the compression strength of spring 56 when air is released from cylinder 58.

The cylinder 58 has a plunger 60 extending therefrom, which plunger is connected to a bracket 62 on U-shaped yoke 46. An air supply line 64 connects with the plunger end of the single acting cylinder 58, so upon introduction of air under pressure into cylinder 58, the plunger 60 urges U-shaped yoke 46 against spring 56, which in turn, urges upstanding, up-turned end 45 of yoke 46 into engagement with thrust bearing 44 to urge spacer element 42 against mounting sprocket 40, which urges friction member 36 into binding engagement with the plane face of set collar 34, whereupon, the roller 32 is rotated in unison with shaft 30 upon rotation of sprocket 40 by chain 41, as will be more fully brought out hereinafter. The up-turned end 48 on the opposite side of yoke 46 is shifted out of engagement with friction member 52, when the face 38 of the hub of the sprocket is in engagement with friction member 36.

Upon release of pressure from air supply line 64, the compression spring 56 will urge up-turned end 48 so the plane face thereof will engage the friction member 52 and urge the friction member into binding engagement with the plane face of set collar 50, which set collar is fixed against rotation with respect to shaft 30. Since yoke 46 is fixedly secured against rotation by plunger 60 and with the cylinder 58 being secured thereto, the roller 32 is secured against rotation and against feeding paper or film 66 thereover and beneath a roller 68, which roller 68 is mounted on shaft 70 so that the roller 68 will rotate about the axis thereof.

Springs 72 each have an end thereof secured to frame 22, which springs, in the present instance, are tension springs, and extend upwardly and are secured one to each end of shaft 70 to draw the shaft within the roller 68 downwardly and rearwardly along a face of bars 74 with the roller 68 being drawn into binding engagement with a sheet of paper or film 66, as will best be seen in FIGS. 3 and 12.

The frame 22 extends downward and has outstanding arms 76 thereon, which arms are apertured at 78 to receive paper 66 in roll form, which roll of paper is mounted on support bar 80 with the paper from the roll extending upwardly, as will best be seen in FIG. 12, over roller 32 and beneath roller 68, which roller 68 may be moved upward over and rearwardly of upstanding bars 74 so as to permit a length of paper to pass thereover and over a first transverse bar 82, thence over a slot 83 formed between a second transverse bar and the first transverse bar 82 thence upward along angular face 13 of apron 12, along the upper face of apron 12 for a predetermined distance, as indicated at 66, FIG. 12. Upon manually moving paper 66 over roller 32 and apron 12, the shaft 70, carrying roller 68, is moved from a point rearward of upstanding bar 74 to the position as shown in FIG. 2, which will enable the roller 68 to be brought into binding engagement with the paper 66 which passes over roller 32.

A double acting cylinder 88 is mounted on brackets 90 and 92 so as to secure the cylinder in parallel relation with shaft 30 but forward of a plane passing through the axis of shaft 30 and outward from an end thereof. The paper cutter air cylinder 88 carries a plunger 94 therein which extends outward and has a cutter blade holding block 96 thereon, on which block is mounted a cutter blade 98 in clamped relation with a plate 100 holding the cutter blade in place by a screw 102. For convenience, a conventional double edged razor blade is shown positioned in place, FIGS. 2 and 4. The plunger 94 is in parallel relation with slot 83 formed between transverse bars 82 and 86, and as the plunger 94 is moved inward within slot 83, the cutting edge of blade 98 is positioned to sever the paper or film lying thereacross.

The block 96 has a recess extending thereinto and to one side of cutter blade 98 and is positioned toward the paper cutter air cylinder 88 so as the plunger 94 is retracted, a roller 104, journaled within block 96, will be moved across the face of the paper 66 as the roller 104 extends below the lower side of block 96 sufficiently to engage the paper to prevent relative movement between the transverse bar 82 and the paper, while the plunger 94 is being retracted.

The arm 15 has transverse bar 106 arranged transversely across the lower end thereof, which bar 106 is parallel to shaft 30. The outwardly extending end of the bar 106 has the chain 41 secured thereto, which chain extends reardwardly over sprocket 40 with a weight 108 secured to the lower end thereof to retract the chain 41 and to rotate the sprocket 40. Upon outward movement of carriage 20 of the sausage molding machine, outwardly extending member 16 moves outward, which, in turn, moves arm 15, to which chain 41 is connected, outward, which rotates sprocket 40 to perform a turning action of shaft 30, when the flat face 38 of the hub of sprocket 40 is in binding engagement with the friction member 36, which, in turn, rotates roller 32, which roller is secured to the friction member 36 by keys or the like. Upon rotation of roller 32 the paper 66, which is in contact frictional relation therewith, due to the pressure exerted by springs 72 on shaft 70, will move roller 68 into binding engagement with paper 66, will move the paper outward onto transverse bar 82 over slot 83 and bar 86 and out over the angular face 13 and onto apron 12; simultaneously with the action, the chain 41, which it attached to transverse bar 106, is moved outwardly with the sprocket 40 being rotated. Simultaneously, the inner end of transverse bar 106 moves along the lower face of outstanding bar 110, which bar is adjustably attached to apron 12 by a bolt 112, which will move the apron 12 from the position as shown in full outline in FIG. 2, to the position as shown in dashed outline therein. Simultaneously with this movement, arcuate cam members 114 and 116, which are pivotally attached to apron 12 by the respective threaded pivot bolts 118 and 120, will move outwardly with the lower face of the respective arcuate cam members rolling on rollers 122 and 124 respectively. The upper face of arcuate cam member 114 has angulated faces 126 thereon, which faces engage with the lower face of a friction slide sleeve 128, which sleeve is slidably mounted on an apertured conduit 129, as will best be seen in FIG. 13, which conduit 129 has ports 130 and 132 therein, which are connected in fluid communication by annular groove 134, in friction slide sleeve 128. When the sleeve 128 is in the position as shown in FIG. 13, air under pressure, is directed through air supply line 136 through apertured conduit 129 through sleeve 128 and out through air line 138 into the end of cylinder 88 opposite the plunger 94 thereof. Whereupon, as air is directed thereinto to move plunger 94 outward, air is simultaneously directed through air line 64 into the plunger end of cylinder 58 to retract plunger 60 to shift U-shaped yoke 46 from a braking position to a clutching position, as has been set out hereinbefore.

As the air is being exhausted from cylinder 88, it is bled out through air line 140 into apertured conduit 142 and out through port 144 to atmosphere, until the plunger 94 is in fully extended position, with the cutter blade positioned in a manner to cut paper 66, upon retraction thereof. As the apron 12 is moved upward, the angulated faces 126 of cam 114 will engage the lower end of friction slide sleeve 128 to move the sleeve upward on apertured conduit 129 to open port 130 which will bleed air from the end of cylinder 88 opposite the plunger thereof, out through air line 138 and port 132. However, the plunger 94 will remain in this position until air is introduced into the plunger end of cylinder 88, as will be more fully brought out hereinafter.

Simultaneously, air will be bled from the plunger end of cylinder 58 out through air line 64, into air line 138 and out through port 132, which will permit the spring 56 to urge U-shaped yoke 46 longitudinally along shaft 30 to bring the face 54 of upstanding end 48 of yoke 46 into binding engagement with friction member 52 to exert a braking action on roller 32. This will hold roller 32 against rotation. This action also disengages the friction member 36 from the face 38 of sprocket 40 so the sprocket 40 is free to rotate on shaft 30, upon further forward or reverse movement of arm 15, to enable the sausage being ejected from the mold to be discharged onto the paper 66 on apron 12.

The amount of paper 66 dispensed onto apron 12 is in direct proportion to the diameter of roller 32 times the number of turns or portions of turns made by the roller 32.

The diameter of the roller 32 is so calculated as to give the maximum length of paper onto apron 12, that will be used to receive the food material or the like ejected thereonto. However, due to variations in lengths of sausages, to obtain the correct weight, and due to differences in density of material, it is sometimes desirable to have less than the maximum amount of paper dispensed onto apron 12. Whereupon, a nut 146 is screwthreaded onto a pivot bolt 118 to adjustably secure bolt 118 in slot 148 in downturned flange of apron 12. The adjustment to move the cam inwardly will lengthen the paper dispensed and moving pin outwardly in slot 148 will shorten the paper dispensed, therefore, the length of paper used can be independently controlled to minute lengths, for the sausage to be dispensed thereonto.

Upon further outward movement of arm 15, the apron 12 will be raised, however, paper will remain static as the sprocket 40 has been disengaged from driving relation with respect to roller 32 and the roller 32 is being held against rotation in either direction.

The arcuate cam member 116 is secured to the downturned flange on the opposite side of apron 12 by a screwthreaded bolt 120 having a nut 150 screwthreaded thereonto, which holds the bolt 120 in fixed relation within slot 152, in the down-turned flange of apron 12. The cam 116 has an angulated face 154 thereon, which engages the lower end of friction slide sleeve 156 which moves the sleeve upwardly to connect port 144 in fluid communication with port 158 in apertured conduit 142 through annular passage 160 in sleeve 156. In so doing, air is directed through air supply line 135 into apertured conduit 142 out through port 158 into annular passage 160, thence through port 144 and into air supply line 140 to direct air into the plunger end of cylinder 88. Since the air has been previously exhausted from cylinder 88 from the opposite end thereof, the plunger 94 is moved rapidly to the other end of the cylinder, which moves cutter mounting block 96 and cutter blade 98 transversely across paper 66 until the plunger 94 is in retracted position.

Simultaneously with the injection of air into the plunger end of cylinder 88, the carriage 20 of the sausage molding machine has moved to the outer terminal point, to eject sausage onto paper 66, on apron 12, an air cylinder 162 has been so timed as to move plunger 164 downward, which carries a sausage cutter blade 166, which will cut sausages from the outer face of pistons in mold cylinder 8, preparatory to lowering the apron 12 to permit sausage S, shown in dashed outline in FIG. 2, to be discharged by gravity into a box or onto a conveyor, when the apron is moved from a horizontial position to an angulated position. At this point arm 15, connected to outstanding extension member 16, moves rearwardly the carriage 20, with cams 168, mounted on the underside of apron 12, are moved into contact with the upper end of friction slide sleeve 128 to urge the sleeve downward, which directs air from air line 136 into apertured conduit 129 out through port 130 into annular groove 134 into port 132 into air line 138 and into the end of cylinder 88 opposite plunger 94 thereof, which re-positions cutter blade block 96 and cutter blade 98 outward for the next operation.

Simultaneously, air is directed from air line 138, through air line 64 into the plunger end of cylinder 58 to retract plunger 60, which plunger is connected to U-shaped yoke member 46 which shifts the yoke 46 against tension of spring 56 and disengages plane face 54, on upturned end 48 of yoke 46, and upon disengagement of friction member 52, the roller 32 is free to rotate. Whereupon, the up-turned end 45 of yoke 46 is urged longitudinally along shaft 30 to act upon thrust bearing 44 and associated elements to move the face 38 of sprocket 40 into binding engagement with friction member 36 which is interposed between set collar 34 and sprocket 40. Simultaneously, with the cams 168 moving downwardly, cams 170 engage the upper end of friction slide sleeve 156 to move the sleeve downwardly on apertured conduit 142 to open port 144 through an air line 140 connected to the plunger end of cylinder 88 to bleed air from the plunger end of cylinder 88, prior to or during which cycle, air is being introduced into the opposite end of cylinder 88 through air line 138.

At this point, the apron 12 has moved from the position as shown in dashed outline in FIG. 2 to the position shown in full lines therein, and the mechanism has been readied for subsequent operation cycles, which are automatic and continuous so long as paper 66 is maintained on a roll for dispensing onto apron 12 and so long as the reciprocation of carriage 20 and outwardly extending member 16 reciprocate arm 15.

While the present mechanism has been described in some detail with respect to placing paper or the like, such as film 66 on the apron 12, preparatory to ejecting molded sausages S or the like thereonto, it is to be understood that the machine is capable of placing any suitable type sheet material thereonto, which sheet material may be cut into lengths by cutter blade 98, as hereinbefore set out.

Although the present machine has been described at some length, with respect to dispensing a sheet of material such as paper, film or the like over roller 32, which roller has an elastomer covering 33 thereon, to dispense and place paper or film in position to receive sausage from a sausage molding machine, for molding skinless sausage. It is to be considered, however, that the present machine, in the broad aspects thereof, can be utilized in any field of endeavor, where similar conditions exist, and the use thereof is not to be considered as limited strictly to a sausage molding machine, as set out above.

The sausage molding machine, as shown in FIG. 1, to which the apparatus for placing sheet material on a surface and cutting the same to a predetermined length, is to be attached, is shown to be mounted on a support standard 1 and seated on adjustable support members 2, with the molding machine being secured thereto by bolts 4, as is fully brought out in our co-pending application, filed as of this date.

Having thus clearly shown and described the invention, what is claimed as new and desired to be secured by Letters Patent is:

1. A sheet placing and cutting apparatus for use with a reciprocating element, which apparatus comprises;
   (a) a frame,
   (b) a first roller journaled on said frame,
   (c) a second roller associated with said frame and being adapted to be selectively engaged with said first roller,
   (d) resilient means associated with said frame to urge said second roller toward said first roller, when said second roller is in one position,
   (e) a sheet material support member associated with said frame,
       (1) a sheet material adapted to pass between said rollers when said rollers are in one position,
       (2) said sheet material support member adapted to receive a supply of sheet material,
   (f) gear means associated with said first roller to selectively rotate said first roller through a predetermined arcuate movement,
   (g) brake means associated with said first roller to arrest the rotation of said first roller upon a predetermined arcuate movement,
   (h) fluid power means operatively associated with said apparatus,
   (i) a clutch member on the first shaft and being interposed between said sprocked and said roller,
   (j) a shift member associated with said sprocket to move said sprocket into clutching engagement with said clutch member to connect said sprocket in driving relation with said first roller,
   (k) a reciprocating arm,
       (1) an arm connected to said fluid power means,
       (2) connector means connected to said arm and to said fluid power means,
   (l) a timing valve assocaited with said fluid power means and timed to simultaneously actuate said braking mechanism and said clutch, and
   (m) cutter means associated with said frame and being selectively movable across the path traversed by said sheet material moving between said rollers.

2. An apparatus for dispensing paper or the like onto a surface, which apparatus comprises;
   (a) a frame,
   (b) a first roller journaled, for rotation about an axis, on said frame,
   (c) a second roller associated with said frame and being selectively engageable with said first roller,
       (1) said first and said second rollers adapted to pass a sheet of paper or the like therebetween upon rotation of said first roller,
   (d) a reciprocatable arm associated with said frame and being movable relative thereto,
       (1) a reciprocating fluid power means operatively connected to said reciprocating arm,
   (e) gearing means interconnecting said arm and said first roller to rotate said first roller upon movement of said reciprocating arm in one direction,
   (f) clutch means to release said gearing means from said roller, when said reciprocating arm moves in the opposite direction,
   (g) brake means adapted to hold said roller against retrogression when said arm moves in the opposite direction,
   (h) a shift member associated with said sprocket and said clutch to connect said sprocket in driving relation with said first roller when in one position,
   (i) a timing valve associated with said fluid power means and timed to simultaneously actuate said braking mechanism and said clutch, and
   (j) a cuttter blade operatively associated with said frame and being movable transversely across the path traversed by said sheet of paper or the like, when said clutch has disengaged said gearing means from said roller.

3. An apparatus for placing sheet material on a surface, which apparatus comprises;
   (a) a frame,
       (1) said frame having a sheet material receiving surface associated therewith,
   (b) a first shaft mounted on said frame in journaled relation,
   (c) a first roller mounted on and secured to said first shaft,
   (d) a sprocket journaled on said first shaft,
   (e) a clutch member on said first shaft and being interposed between said sprocket and said roller,
   (f) a shift member associated with said sprocket to move said sprocket into clutching engagement with said clutch member to connect said sprocket in driving relation with said first roller,
   (g) a reciprocating arm,
       (1) said arm adapted to connect to a reciprocating power member,
       (2) connector means to connect said arm to the reciprocating power member,
   (h) a chain associated with said arm and being movable therewith,
       (1) said chain being operatively associated with said sprocket in driving relation,
       (2) a weight associated with said chain near the end thereof opposite said arm,
   (i) a brake member mounted on said first shaft and being associated with said frame,
   (j) means associated with said shift means to engage said brake upon disengagement of said clutch,
   (k) a second shaft associated with said frame,
       (1) a second roller mounted on said second shaft and adapted to rotate about the axis of said second shaft and adapted to engage said first roller when in one position to issue sheet material therebetween,
   (l) upstanding abutments secured to said frame and spaced outwardly from the ends of said second roller,
   (m) resilient means connected to said second shaft to urge said second roller into engagement with said first roller and said second shaft into engagement with said abutments, and
   (n) a support associated with said frame to support a supply of sheet material.

4. An apparatus for placing sheet material on a surface, which apparatus is defined in claim 3, and wherein;
   (a) said sheet material receiving surface is an apron which is movable, (b) means to move said apron from a supporting angle to a discharge angle.

5. An apparatus for placing sheet material on a surface, as defined in claim 3, wherein;
(a) said first roller is rubber covered.

6. An apparatus for placing sheet material on a surface as defined in claim 4, wherein;
(a) an air cylinder is operatively connected to said shift means,
(b) a timing valve means is associated with said reciprocatable arm to selectively direct air to said shift means to actuate said clutch.

7. An apparatus for placing sheet material on a surface as defined in claim 6, wherein;
(a) said timing valve being simultaneously actuated to actuate a braking mechanism and said clutch.

8. An apparatus for placing sheet material on a surface as defined in claim 7, wherein;
(a) said braking mechanism is resiliently engageable.

9. An apparatus for placing sheet material on a surface as defined in claim 6, wherein;
(a) cam means is associated with said timing valve to actuate said valve in timed relation to the movement of said apron, and
(b) said apron being movable by said reciprocating arm.

10. A sheet placing and cutting apparatus for use with a reciprocating element, which apparatus comprises;
(a) a frame,
(b) a first roller journaled on said frame,
(c) a second roller associated with said frame and being adapted to selectively engage said first roller,
(d) resilient means associated with said frame to urge said second roller towards said first roller, when said second roller is in one position,
  (1) an abutment at each end of said second roller to divert a component of force against said first roller when said second roller is in said first mentioned position,
  (2) said abutment adapted to hold said second roller out of engagement with said first roller when in another position,
(e) a sheet material support member associated with said frame,
  (1) a sheet material adapted to pass between said rollers when said rollers are in one position,
  (2) said sheet material support member adapted to receive a supply of sheet material,
(f) a sprocket associated with said first roller,
  (1) a chain extending over said sprocket in driving relation,
  (2) one end of said chain adapted to be secured to the reciprocating element,
  (3) the other end of said chain having a pull element attached thereto,
  (4) said sprocket adapted to selectively rotate said first roller in one direction through a predetermined arcuate movement,
(g) brake means associated with said frame and with said first roller to arrest the rotation of said first roller upon a predetermined arcuate movement, and
(h) cutter means associated with said frame and being selectively movable across the path traversed by said sheet material moving between said rollers.

11. A sheet placing and cutting apparatus for use with a reciprocating element, as defined in claim 10, wherein;
(a) said first roller is complementally engageable with said sprocket in driving relation when in one position,
(b) a fluid actuated cylinder for engaging said sprocket and said first roller when in driving relation, and
(c) cam timing means associated with said cylinder to actuate said clutch in timed relation with the reciprocation of said reciprocating element.

12. A sheet placing and cutting apparatus for use with a reciprocating element, as defined in claim 10, wherein;
(a) said brake means associated with said first roller is resiliently actuated, and
(b) said resilient action of said brake means being operatable to engage said brake substantially upon disengagement of said clutch by the actuation of said fluid cylinder.

13. An apparatus for placing sheet material on a surface, as defined in claim 4, wherein;
(a) arcuate cam members are attached to said apron and movable therewith,
(b) said means to shift said clutch being an air cylinder,
(c) air valves associated with said respective arcuate cam members,
(d) one of said air valves associated in operative relation with said first cylinder to engage said clutch member,
(e) a second air cylinder associated with said frame,
(f) said cutter being associated with said second air cylinder and movable transversely across a path traversed by said sheet material,
  (1) said second arcuate cam member, and
(g) one of said air valves associated with said arcuate cam members adapted to control the flow of air to said second air cylinder to actuate said cutter.

References Cited

UNITED STATES PATENTS

| | | | |
|---|---|---|---|
| 2,800,178 | 7/1957 | Taylor | 83—264 X |
| 2,827,286 | 3/1958 | Taylor | 226—90 |
| 2,839,138 | 6/1958 | Wilhelm | 83—264 |

JAMES M. MEISTER, *Primary Examiner.*

U.S. Cl. X.R.
83—264, 436, 614